United States Patent
Ahmad et al.

(10) Patent No.: US 8,865,255 B2
(45) Date of Patent: *Oct. 21, 2014

(54) METHOD FOR ASSESSING THE COOLANT CONSUMPTION WITHIN ACTIVELY COOLED COMPONENTS

(75) Inventors: Fathi Ahmad, Kaarst (DE); Knut Halberstadt, Mülheim an der Ruhr (DE); Christian Lerner, Dorsten (DE)

(73) Assignee: Siemens Aktiengesellschaft, Munich (DE)

( * ) Notice: Subject to any disclaimer, the term of this patent is extended or adjusted under 35 U.S.C. 154(b) by 54 days.

This patent is subject to a terminal disclaimer.

(21) Appl. No.: 13/576,405

(22) PCT Filed: Feb. 23, 2011

(86) PCT No.: PCT/EP2011/052684
§ 371 (c)(1),
(2), (4) Date: Sep. 5, 2012

(87) PCT Pub. No.: WO2011/104276
PCT Pub. Date: Sep. 1, 2011

(65) Prior Publication Data
US 2012/0321825 A1    Dec. 20, 2012

(30) Foreign Application Priority Data

Feb. 23, 2010   (EP) ..................... 10001849

(51) Int. Cl.
| | | |
|---|---|---|
| C23C 16/00 | (2006.01) | |
| B05D 7/22 | (2006.01) | |
| C23C 10/00 | (2006.01) | |
| C23C 10/18 | (2006.01) | |
| C23C 10/06 | (2006.01) | |
| C23C 10/48 | (2006.01) | |

(52) U.S. Cl.
CPC ................. *C23C 10/00* (2013.01); *C23C 10/18* (2013.01); *C23C 10/06* (2013.01); *Y02T 50/67* (2013.01); *C23C 10/48* (2013.01)
USPC ......... 427/230; 427/238; 427/252; 427/248.1

(58) Field of Classification Search
None
See application file for complete search history.

(56) References Cited

U.S. PATENT DOCUMENTS

| | | | |
|---|---|---|---|
| 5,928,725 A * | 7/1999 | Howard et al. | ............... 427/237 |
| 6,024,792 A | 2/2000 | Bieler | |
| 2003/0041923 A1* | 3/2003 | Kircher | ......................... 148/240 |
| 2008/0107808 A1* | 5/2008 | Beele et al. | ................... 427/237 |

FOREIGN PATENT DOCUMENTS

| | | |
|---|---|---|
| CN | 1804104 A | 7/2006 |
| DE | 3827141 C1 | 12/1989 |
| DE | 102005030925 A1 | 1/2007 |
| EP | 0486489 B1 | 11/1994 |
| EP | 0412397 B1 | 3/1998 |
| EP | 0892090 A1 | 1/1999 |

(Continued)

*Primary Examiner* — Joseph Miller, Jr.

(57) ABSTRACT

A process for setting the average flow rate within a hollow component is provided. The process includes setting a relatively small wall thickness in a first region with a relatively large flow cross section using a first diffusion coating process and setting a relatively large wall thickness by a second different diffusion process in a second region with a relatively small flow cross section. The use of different diffusion coatings in a component allows the flow of coolant through a component to be set in a controlled manner.

3 Claims, 4 Drawing Sheets

(56) References Cited

FOREIGN PATENT DOCUMENTS

| | | |
|---|---|---|
| EP | 0786017 B1 | 3/1999 |
| EP | 0984071 A1 | 3/2000 |
| EP | 0984074 A1 | 3/2000 |
| EP | 1288330 A1 | 3/2003 |
| EP | 1306454 A1 | 5/2003 |
| EP | 1319729 A1 | 6/2003 |
| EP | 1204776 B1 | 6/2004 |
| EP | 1672089 A1 | 6/2006 |
| EP | 1889943 A1 | 2/2008 |
| WO | WO 9967435 A1 | 12/1999 |
| WO | WO 0044949 A1 | 8/2000 |

\* cited by examiner

FIG 6

| Material | Chemical composition in % | | | | | | | | | | | | |
|---|---|---|---|---|---|---|---|---|---|---|---|---|---|
| | C | Cr | Ni | Co | Mo | W | Ta | Nb | Al | Ti | B | Zr | Hf |
| Ni-based investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | |
| IN 792 DS | 0.08 | 12.5 | Rem. | 9.0 | 1.9 | 4.1 | 4.1 | | 3.4 | 3.8 | 0.015 | 0.02 | 1.00 |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX 2 | <.006 | 8.0 | Rem. | 4.6 | 0.6 | 8.0 | 6.0 | | 5.6 | 1.0 | <.003 | <.0075 | 0.10 |
| CMSX 3 | <.006 | 8.0 | Rem. | 4.6 | 0.6 | 8.0 | 6.0 | | 5.6 | 1.0 | <.003 | <.0075 Re=3.0 | 0.10 |
| CMSX 4 | | 6.0 | Rem. | 10.0 | 0.6 | 6.0 | 6.0 | | 5.6 | 1.0 | <.0075 | <.0075 | 0.10 |
| CMSX 6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M 509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

METHOD FOR ASSESSING THE COOLANT CONSUMPTION WITHIN ACTIVELY COOLED COMPONENTS

CROSS REFERENCE TO RELATED APPLICATIONS

This application is the US National Stage of International Application No. PCT/EP2011/052684, filed Feb. 23, 2011 and claims the benefit thereof. The International Application claims the benefits of European Patent Office application No. 10001849.8 EP filed Feb. 23, 2010. All of the applications are incorporated by reference herein in their entirety.

FIELD OF INVENTION

The invention relates to a process for setting the coolant consumption within actively cooled components and to a component.

BACKGROUND OF INVENTION

Components which are used at high temperatures, e.g. turbine blades or vanes in gas turbines, have active cooling, during which a coolant is introduced into the interior and runs through the turbine blade or vane through coolant ducts, and if appropriate emerges from film-cooling holes.

In this case, it is important that the turbine blade or vane is not cooled excessively, since this greatly increases the coolant consumption, which in turn would reduce the efficiency of the turbine because the cooling air is mostly taken from the compressor.

It is therefore important to set the coolant consumption by optimally setting the flow rate.

SUMMARY OF INVENTION

The object is achieved by a process as claimed in the claims and by a component as claimed in the claims.

The dependent claims list further advantageous measures which can be combined with one another, as desired, in order to obtain further advantages.

BRIEF DESCRIPTION OF THE DRAWINGS

FIG. 6 shows a list of superalloys.

The figures and the description show merely exemplary embodiments of the invention.

DETAILED DESCRIPTION OF INVENTION

Figure 1:
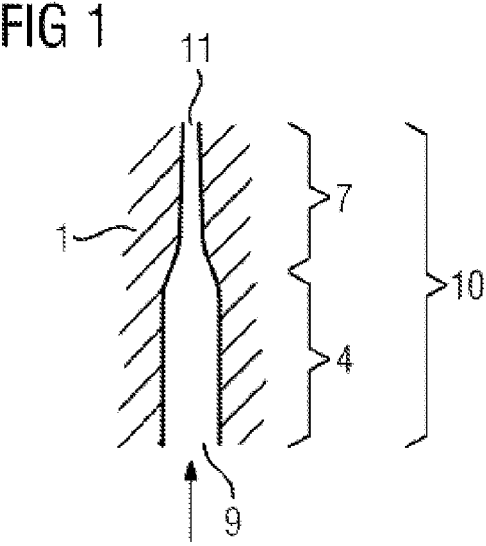
FIGS. 1, 2 and 3 show schematic illustrations of the invention.

FIG. 1 schematically shows at least part of an inner duct 10 of the component 1.

The duct 10 is in particular a cooling duct 10 and can be divided into various regions, here preferably into two regions 4 and 7, which have a greater cross section at the start at the inlet 9 than at the outlet 11.

Accordingly, there are regions 4, 7 with different flow cross sections.

The regions 4, 7 do not have to lie at the inlet 9 or at the outlet 11.

Figure 4:
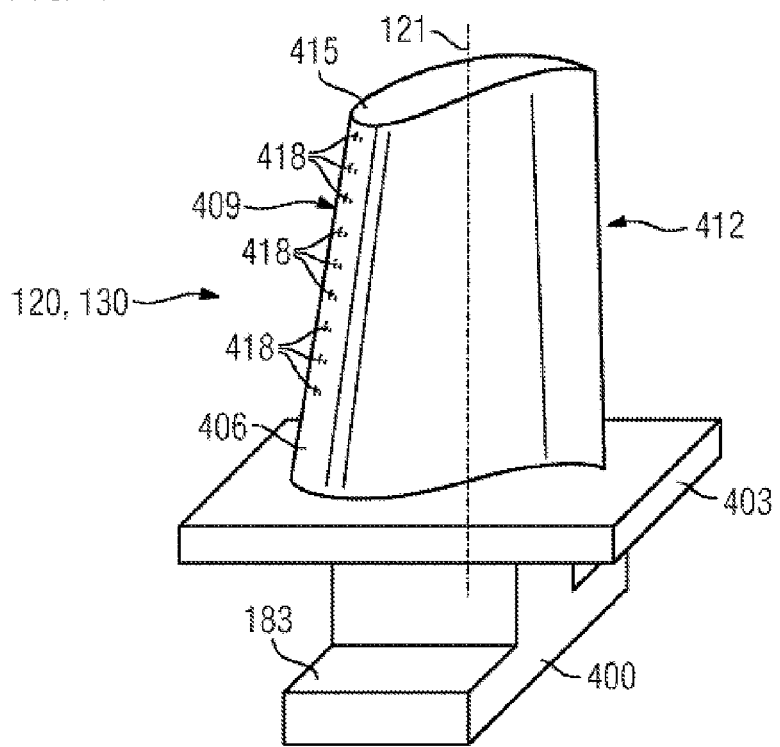
FIG. 4 shows a turbine blade or vane.

In the case of a turbine blade or vane, the inlet 9 is located in the region of the root 400 (FIG. 4), and the outlet 11 is located in the region of the trailing edge 412 (FIG. 4).

The component 1, 120, 130 can have a plurality of cooling ducts.

The invention proposes providing the various regions 4, 7 with diffusion coatings, which lead to the thickening and thus to a constriction of the passage through the cooling duct 10 at various regions 4, 7.

Figure 2:
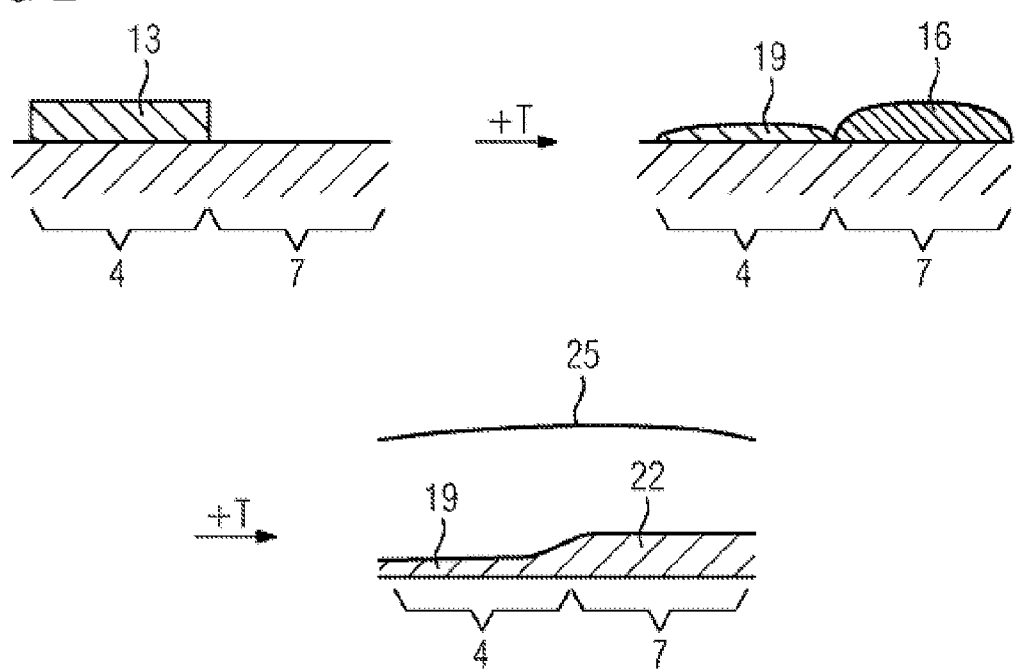

Therefore, a diffusion coating 19, which leads to the wall thickening (FIG. 2), is produced by a first diffusion coating process by means of a material 13 only in the first region 4.

In a second step, material 16 is applied only in the second region 7, in order to likewise produce a diffusion coating in the region 7, which leads to a second diffusion coating 22, which, however, leads to a greater thickening than in the region 4 in particular owing to a different coating process.

The material 16 can correspond to the material 13 of the first coating process, or can be different.

The diffusion coatings 19 and 22 preferably form a continuous diffusion coating 25.

For the regions 4, 7, this is preferably an aluminization process, where NiAl is used for the region 4 for the diffusion coating process and/or $Ni_2Al_3$ is used for the region 7 for diffusion coating.

Figure 3:
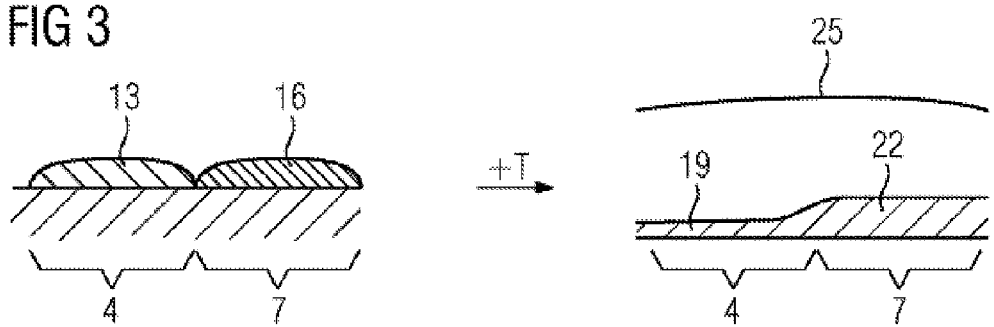

The two coating processes can also be employed at the same time, as shown in FIG. 3.

It is preferable for the entire inner region of the turbine blade or vane 120, 130 to be coated.

Figure 5:
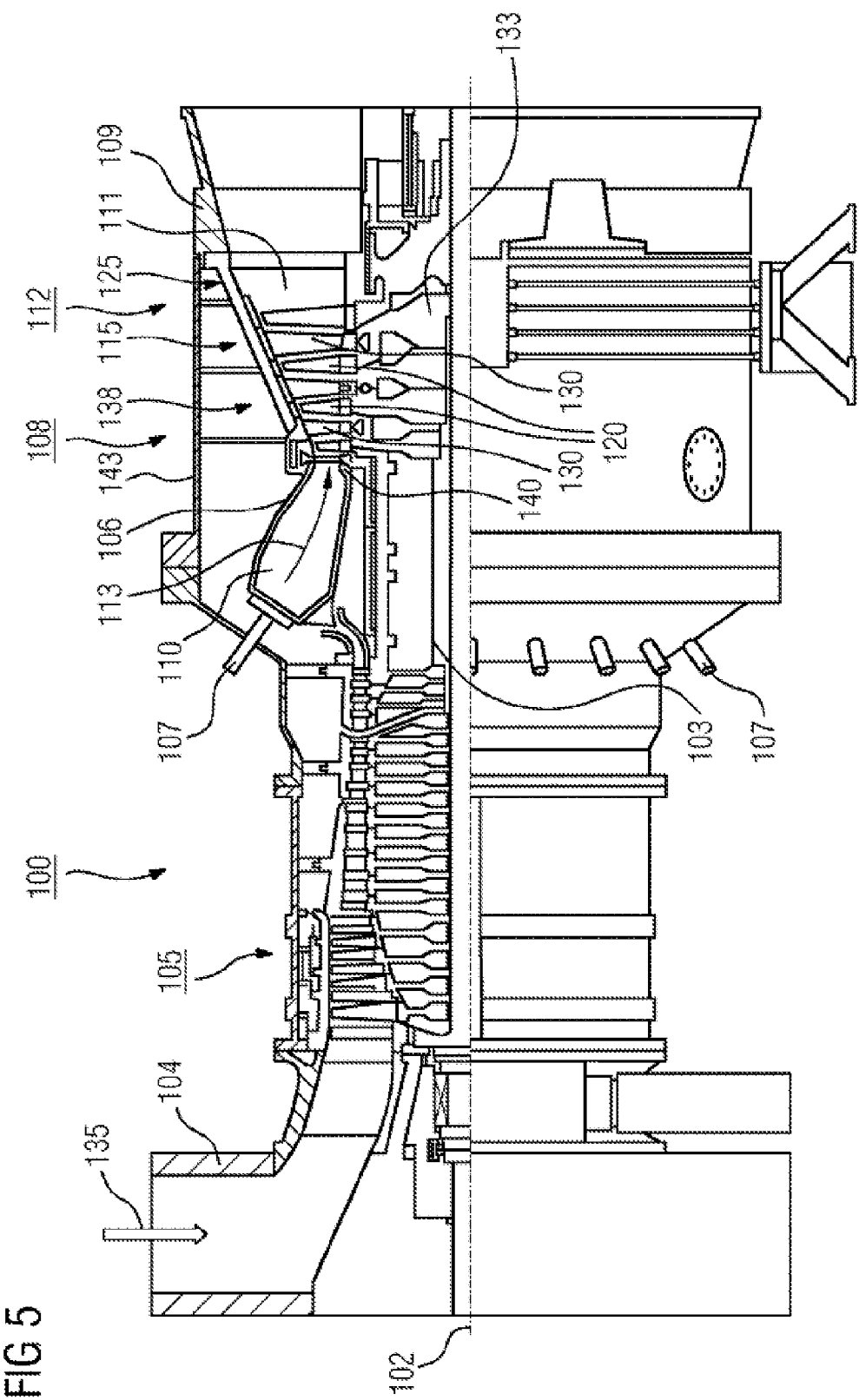
FIG. 5 shows a gas turbine.

FIG. 5 shows, by way of example, a partial longitudinal section through a gas turbine 100.

In the interior, the gas turbine 100 has a rotor 103 with a shaft which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

FIG. 4 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al -0.6Y-0.7Si or Co-28Ni-24Cr-10Al -0.6Y. In addition to these cobalt-based protective coatings, it is also preferable to use nickel-based protective layers, such as Ni-10Cr-12Al -0.6Y-3Re or Ni-12Co-21Cr-11Al -0.4Y-2Re or Ni-25Co-17Cr-10Al -0.4Y-1.5Re.

It is also possible for a thermal barrier coating, which is preferably the outermost layer, to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

The thermal barrier coating covers the entire MCrAlX layer. Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

The invention claimed is:

1. A process for setting the average flow rate within a hollow component, comprising:
    providing the hollow component with a duct, in the interior, including a plurality of regions which have a flow cross section, a first region with a smaller cross section and a second region with a larger cross section;
    setting a first wall thickness increase in the second region with the larger flow cross section by a first diffusion coating process; and setting a second wall thickening by a second, different diffusion coating process, in the first region with the smaller flow cross section, wherein the first wall thickness increase is smaller than the second wall thickening, wherein aluminization processes are used for the diffusion processes, wherein NiAl is used as the aluminum source only in the second region for the first diffusion coating process, and wherein $Ni_2Al_3$ is used as the aluminum source only in the first region for the second diffusion coating process.

2. The process as claimed in claim 1, wherein the diffusion processes are carried out in succession.

3. The process as claimed in claim 1, wherein the diffusion processes are carried out at the same time.

* * * * *